United States Patent
Yamamoto (10) Patent No.: US 7,149,069 B2
(45) Date of Patent: Dec. 12, 2006

(54) OVERTEMPERATURE DETECTION DEVICE AND SEMICONDUCTOR INTEGRATED CIRCUIT DEVICE

(75) Inventor: Tomohisa Yamamoto, Hoi-gun (JP)

(73) Assignee: Denso Corporation, Kariya (JP)

( * ) Notice: Subject to any disclaimer, the term of this patent is extended or adjusted under 35 U.S.C. 154(b) by 317 days.

(21) Appl. No.: 10/764,541

(22) Filed: Jan. 27, 2004

(65) Prior Publication Data
US 2004/0184209 A1    Sep. 23, 2004

(30) Foreign Application Priority Data
Jan. 30, 2003    (JP)    .............................. 2003-021952

(51) Int. Cl.
*H02H 5/04*    (2006.01)
(52) U.S. Cl. ...................... 361/103; 340/653
(58) Field of Classification Search ................. 361/24, 361/103; 340/651, 653
See application file for complete search history.

(56) References Cited

U.S. PATENT DOCUMENTS

| | | | |
|---|---|---|---|
| 4,854,731 A | * | 8/1989 | Jenkins ........................ 374/178 |
| 5,206,778 A | | 4/1993 | Flynn et al. |
| 5,355,123 A | * | 10/1994 | Nishiura et al. ............. 340/653 |
| 5,918,982 A | * | 7/1999 | Nagata et al. ............... 374/178 |
| 6,046,470 A | * | 4/2000 | Williams et al. ............. 257/328 |

FOREIGN PATENT DOCUMENTS

| | | |
|---|---|---|
| JP | A-61-231618 | 10/1986 |
| JP | A-07-336875 | 12/1995 |
| JP | A-2000-031290 | 1/2000 |
| JP | A-2000-116022 | 4/2000 |
| JP | A-2001-244141 | 9/2001 |
| JP | A-2001-244411 | 9/2001 |

\* cited by examiner

*Primary Examiner*—Stephen W. Jackson
*Assistant Examiner*—S Bauer
(74) *Attorney, Agent, or Firm*—Posz Law Group, PLC

(57) ABSTRACT

In a device having multiple power components adjacently arranged to each other, two diodes are disposed adjacent to each power component. The first diode is placed adjacent to any one of the sides of the power component, and the second diode is placed adjacent to the opposite side of the power component. The sides are opposed to the sides of adjacent power components. An overtemperature detection circuit outputs an overtemperature detection signal when outputs of the diodes both decrease under a reference voltage.

8 Claims, 5 Drawing Sheets

OVERTEMPERATURE DETECTION DEVICE AND SEMICONDUCTOR INTEGRATED CIRCUIT DEVICE

CROSS REFERENCE TO RELATED APPLICATION

This application is based on and incorporates herein by reference Japanese Patent Application No. 2003-21952 filed on Jan. 30, 2003.

FIELD OF THE INVENTION

The present invention relates to an overtemperature detection device and a semiconductor integrated circuit device including the overtemperature detection device.

BACKGROUND OF THE INVENTION

A driver IC module having multiple high breakdown voltage drivers and an overtemperature detection circuit is proposed in Japanese Patent Application JP-A-2001-244411. The overtemperature detection circuit detects an overtemperature condition of a driver IC chip based on a difference between a temperature of the IC chip and a reference temperature. The reference temperature is altered according to a temperature of the driver IC module so that the detection is accurately performed without an influence of ambient temperature.

An overtemperature detector having a band gap circuit that produces a reference voltage used in a production of an overtemperature detection signal is proposed in Japanese Patent Application JP-A-7-336875. In the band gap circuit, a component that outputs a temperature-dependent potential difference functions as an overtemperature detection component. The overtemperature detection signal is used for maintaining a predetermined accuracy in the overtemperature detection without affected by manufacturing variations.

In an IC device having an overtemperature detection circuit for each driver IC such as the above-described driver IC module, a temperature increase in the driver IC may affect an adjacent overtemperature detection circuit of another drive IC. For instance, the adjacent overtemperature detection circuit may falsely detect an overtemperature condition when a load connected to the driver IC is shorted and the temperature increase occurs.

This problem may be solved by arranging the driver ICs at a distance from each other. However, the overall chip size of the device increases and therefore the cost of the device increases. The same problem occurs in the case of a device constructed of multiple discrete power components adjacently arranged to each other.

SUMMARY OF THE INVENTION

The present invention therefore has an objective to provide an overtemperature detection device that accurately detects an overtemperature condition of each of power components adjacently arranged to each other. An overtemperature detection device of the present invention includes temperature detection components and an overtemperature detection circuit. At least two detection components are arranged adjacent to each power component. First and second detection components are placed adjacent to any one of the sides of the power component and another side of the power component, respectively.

When a first power component is in an overtemperature condition, the heat produced by the first power component is immediately transmitted to the adjacent detection components. When a second power component adjacent to the first power component is in an overtemperature condition, the heat is immediately transmitted to the detection component between the first and the second power component. However, the heat is not immediately transmitted to the detection component on the other side of the first power component. This is because the detection component on the other side and the power component in the overtemperature condition are away from each other.

The detection circuit determines the overtemperature condition when signals outputted from at least two of the detection components adjacent to the power component indicate the overtemperature condition. It does not determine the overtemperature condition when a signal outputted from only one of the temperature detection components indicates the overtemperature condition.

A signal outputted from the detection component on the other side may indicate an overtemperature condition after a certain period has passed. However, power supply to the power component is controlled when the overtemperature condition is determined. Therefore, the signal outputted from the detection component on the other side will not indicate the overtemperature condition. With the configuration of the present invention, an overtemperature condition of each power component is accurately detected.

The present invention has another objective to provide a semiconductor integrated circuit (IC) device in which the overtemperature detection device is used. An IC device of the present invention includes multiple power components and the overtemperature detection device described above. With this overtemperature detection device, the power components are adjacently arranged to each other. As a result, a layout size of the output section of the IC device can be reduced and the total size of the IC device can be reduced.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENT

The preferred embodiments of the present invention will be explained with reference to the accompanying drawings. In the drawings, the same numerals are used for the same components and devices.

[First Embodiment]

Figure 1:
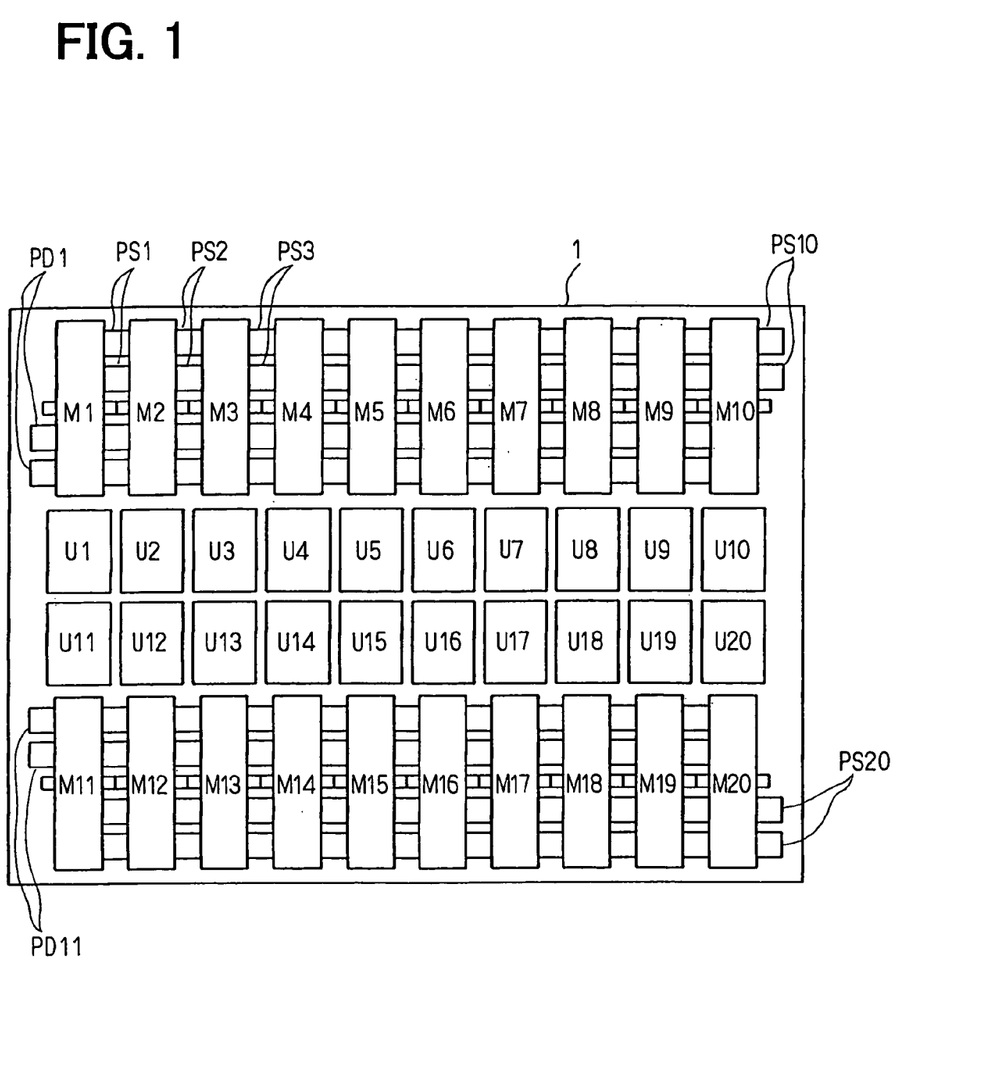
FIG. 1 is a plan view of a semiconductor chip showing an arrangement of electronic components according to the first embodiment of the present invention.

An integrated circuit (IC) shown in FIG. 1 is used for driving a relay coil for switching power supply to devices including a headlight, a door lock solenoid, and a power window motor. The IC is mounted on a control board included in an electronic control unit (ECU) for a vehicular body parts.

The same size power MOS transistors M1–M10 are adjacently arranged to each other in line and mounted on an IC board 1. The same size power MOS transistors M11–M20 are also adjacently arranged to each other in line and mounted on an IC board 1 on the side opposite from the side on which the power MOS transistors M1–M10 are mounted. Wire bonding pads (PS1, PD1)–(PS20, PD20) are provided for the power MOS transistors M1–M20, respectively. Furthermore, diodes (D1a, D1b)–(D20a, D20b) and output control circuits U1–U20 are provided for the power MOS transistors M1–M20, respectively. Although only driver IC is mounted on the IC board 1 in this IC, other control circuits can be formed on the IC board 1.

The diodes (D1a, D1b)–(D20a, D20b) are temperature detection components that detect temperature using forward voltage temperature characteristics of −2 mV/° C. Each diode (D1a, D1b)–(D20a, D20b) is arranged between the two transistors except for ones arranged ends of lines of the transistors M1–M20. The output control circuits U1–U20 are disposed in line adjoining to their respective transistors M1–M20.

Figure 2:
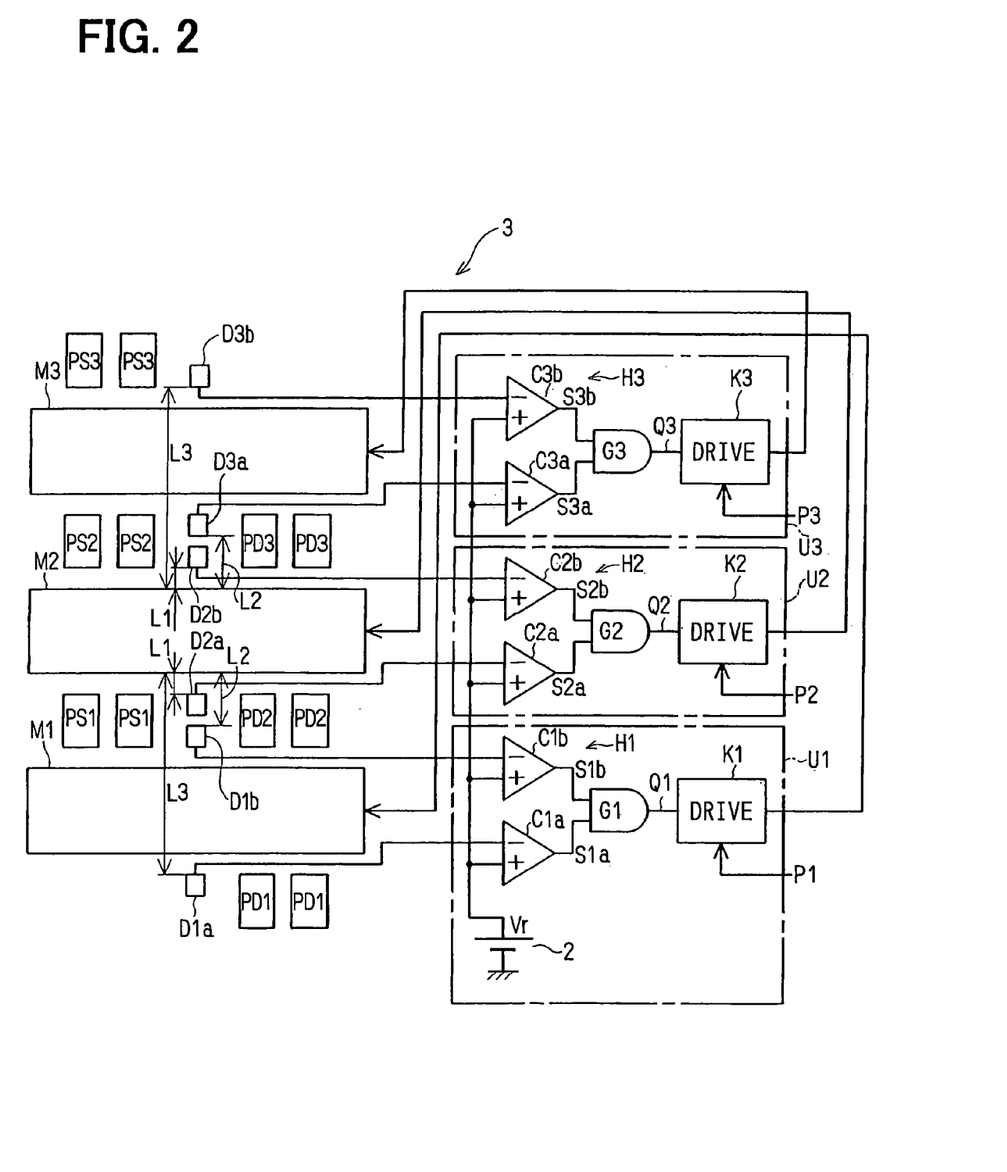
FIG. 2 is an enlarged view of the semiconductor chip with a circuit diagram of output control circuits according to the first embodiment.

Referring to FIG. 2, the diodes D2a and D2b are arranged on the sides of the transistor M2 adjacent to the transistor M1 and to the transistor M3, respectively. The diodes D1a, D1b, D3a and D3b are arranged in the same manner on the sides of the transistor M1 and M3. A distance L1 between the diodes D2a and D2b, a distance L2 between the diodes D1b and D3a, and a distance L3 between the diodes D1a and D3b have relationships of L1<L2<L3. It is preferable to set the distance L1 as short as possible for reducing heat transmission delay.

Each output control circuit U1–U3 is constructed of an overtemperature detection circuit H1–H3 and a drive circuit K1–K3. The drive circuit K1–K3 drives the transistor M1–M3 and functions as an overtemperature protection circuit. The detection circuit H1 includes comparators C1a, C1b and an AND gate G1. The comparators C1a, C1b compare the forward voltage V1a, V1b of the diodes D1a, D1b with a reference voltage Vr. The AND gate G1 outputs an overtemperature detection signal Q1 that is an AND signal of outputs S1a and S1b of the comparator C1a and C1b. The detection circuits H2, H3 have the same configuration. An overtemperature detection device 3 is constructed of the output control circuits U1–U3 and the diodes (D1a, D1b)–(D3a, D3b).

The drive circuit K1 outputs a gate drive signal to the transistor M1 when the detection signal Q1 is at a low (L) level, which indicates a normal condition (non-overtemperature condition). The gate drive signal is produced according to a drive instruction signal P1. When the detection signal Q1 is at a high (H) level, which indicates an overtemperature condition, a gate drive signal is outputted for turning off the transistor M1. The output control circuits U2 and U3 have the same configuration. The output control circuit U1 further includes a reference voltage generation circuit 2 that generates the reference voltage Vr.

Relay coils (loads) are connected between a drain or a source of the transistors M1–M3 and power supply lines that are connected to a battery. The temperatures of the transistors M1–M3 remain in the operable temperature range as long as the transistors M1–M3 and the loads are not defective and the transistors M1–M3 are used within the current rating range. However, the temperatures sharply increase when a large current flows through the transistors M1–M3, for instance when the loads are shorted, the temperatures increase above the range in a short period of time.

Figure 3:
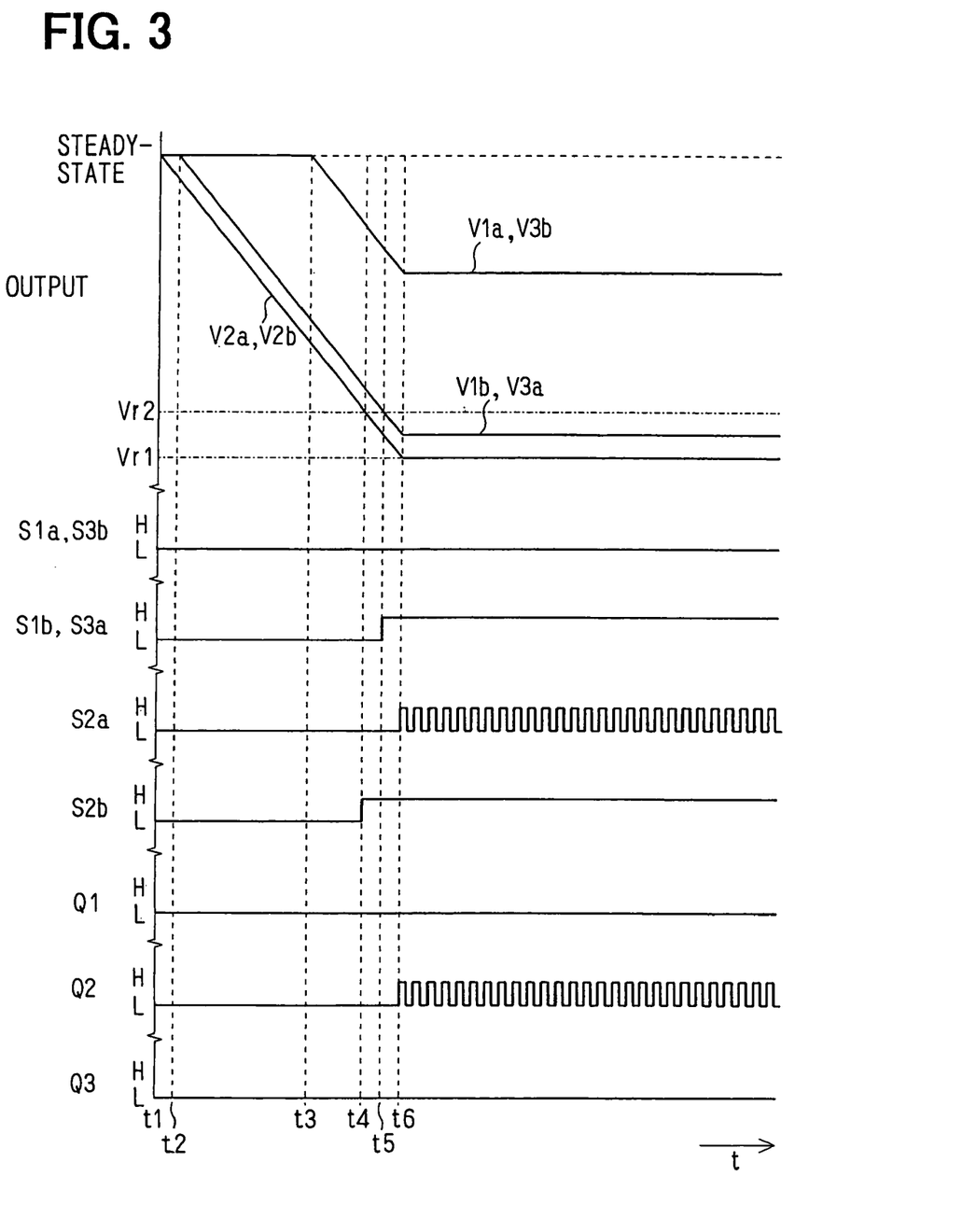
FIG. 3 is a timing chart showing waveforms of output voltages of diodes and output signals according to the first embodiment.

The forward voltages of the diodes D1a–D3b vary when excessive current flows through the transistor M2 as shown in FIG. 3. In FIG. 3, reference numbers V1a, V1b, V2a, V2b, V3a, V3b denote forward voltages of the diodes D1a, D1b, D2a, D2b, D3a and D3b, and S1a, S1b, S2a, S2b, S3a, S3b denote output signals of the comparators C1a, C1b, C2a, C2b, C3a and C3b.

The reference voltage Vr is set equal to an output voltage of the diodes Da1–D3b in the operable temperature range or a temperature range defined by the operable range with a margin. The reference voltage Vr is less likely to be affected by temperature variations. Reference voltages Vr1, Vr2 are substantial reference voltages (threshold voltages) of the comparators C1a–C3b. The reference voltages Vr1, Vr2 are defined with consideration of variations in offset voltages, and therefore they may be slightly different from the reference voltage Vr.

The substantial reference voltage Vr1 is set for the comparator C2a, input voltage of which is V2a. The substantial reference voltage Vr2 is set for the comparator C1a, C1b, C2b, C3a, C3b, input voltages of which are V1a, V1b, V2b, V3a and V3b, respectively. The voltages V1a–V3b are higher than the reference voltages Vr, Vr1, Vr2 under normal conditions in which no excessive current exists.

When excessive current flows through the transistor M2, the heat produced in the transistor M2 is transmitted to the diodes D2a, D2b after a time lag about at time t1. The voltages V2a, V2b decrease at approximately the same rate. The heat transmission to the diodes D1b, D3a, which are located further away from the transistor M2 than the diodes D2a, D2b, delays a time of t2–t1. The heat transmission to the D1a, D3b, which are still further away from the transistor M2 than the diodes D2a, D2b, delays a time of t3–t1.

When the voltage V2b of the diodes D2b decreases to the reference voltage Vr2, the signal S2b becomes the H level (t4). The signal S2a that indicates a result of a comparison between the output voltage V2a of the diode D2a and the reference voltage Vr1 is still the L level at this time. Thus, the overtemperature detection signal Q2 remains at the L level. When the output voltage V2a decreases to the reference voltage Vr1, the signal S2a becomes the H level (t6). As a result, the signals S2a and S2b are both the H levels, and the detection signal Q2 shifts from the L level to the H level, namely, it indicates the overtemperature condition.

When the detection signal Q2 becomes the H level, the drive circuit K2 turns off the transistor M2. Therefore, the current supply to the transistor M2 is stopped and further temperature increase is controlled. When the output voltage V2a becomes higher than the reference voltage Vr1, the signal S2a becomes the L level and the transistor M2 turns on. Hysteresis control is not used in this device, and therefore the detection signal Q2 frequently shifts between the H level and the L level for maintaining the output voltage V2a under the reference voltage Vr1. The transistor M2 repeatedly turns on and off according to the detection signal Q2. As a result, the temperature of the transistor M2 is restricted within the operable temperature and therefore the failure in the transistor M2 due to overtemperature is reduced.

The detection signals Q1, Q3 remain at the L level because normal current flows through the transistors M1, M3. The output voltage V1a of the diode D1a located adjacent to the transistor M1 is much higher than the reference voltage Vr2 at time t6 because the diode D1a is located away from the transistor M2. Thus, the signal S1a remains at the L level.

The diode D1b located adjacent to the transistor M1 is arranged on the side close to the transistor M2. Therefore, the output voltage V1b decreases to the reference voltage Vr2 at time t5, which is previous to time t6, and the signal S1b is the H level after time t5.

The detection signal Q1 becomes the H level only in the condition that the signals S1a and S1b are both the H levels. Therefore, the detection signal Q1 remains at the L level even when the reference voltage Vr2 is higher than the reference voltage Vr1, namely, the overtemperature condition is detected earlier than time t5. This is the same in the case of the transistor M3, and in the case that variations in the forward voltages V1a–V3b of the diodes D1a–D3b exist.

In the above-described IC, multiple transistors Mn (n=1, 2, 3, . . . ) are arranged on a chip in line and diodes Dna, Dnb (n=1, 2, 3, . . . ) are disposed adjacent to opposed sides of each transistor Mn (n=1, 2, 3, . . . ). The opposed sides are the ones that orthogonal to the line of transistors Mn. The overtemperature detection circuit Hn switches overtemperature detection signal Sn to the H level that indicates an overtemperature condition when a signal Sna regarding a diodes Dna and a signal Snb regarding a diode Dnb both become the H level.

With this configuration, heat produced in a transistor Mn in an overtemperature condition is transmitted to the diodes Dna, Dnb adjacent to the sides of the transistor Mn in a short time, and the detection signal Sn becomes the H level. Two diodes Dna and Dnb are exclusively provided for each transistor Mn, and therefore the diodes Dna and Dnb can be arranged as closely as possible to the transistor Mn. The period between a start of excessive current flowing due to a shortage of a load and a stop of driving of the transistor Mn via a drive circuit Kn can be shortened. Thus, the transistor Mn is properly protected and its substantial durability improves.

When an adjacent transistor Mn+1 becomes in an overtemperature condition, the heat produced in the transistor Mn+1 is transmitted to the diode Dnb located between the transistors Mn and Mn+1 in a short time. However, the heat transmission to the diode Dna located between the transistors Mn and Mn−1 delays because the diode Dna is away from the diode Mn+1. An overtemperature detection signal Sn+1 becomes the H level before the signals Sna and Snb both become the H level even when offset voltages of comparators Can, Cnb or forward voltages of the diodes Dna, Dnb have variations. As a result, the driving of the transistor Mn+1 is controlled. This reduces erroneous detection in which the transistor Mn that is not in the overtemperature condition is detected as in the overtemperature condition. Thus, an accuracy of the overtemperature detection improves.

Even when distances between the transistors Mn are shortened, the relationships of the distances L1<L2<L3 are maintained. Therefore, the distances between the transistor Mn and the diodes Dna, Dnb exclusively provided for the transistor Mn can be set as short as possible. Moreover, at least one of the diodes Dna, Dnb is away from the adjacent transistor Mn−1, Mn+1. Thus, accurate overtemperature detection can be performed even though the total size of the IC chip is substantially reduced.

[Second Embodiment]

Figure 4:
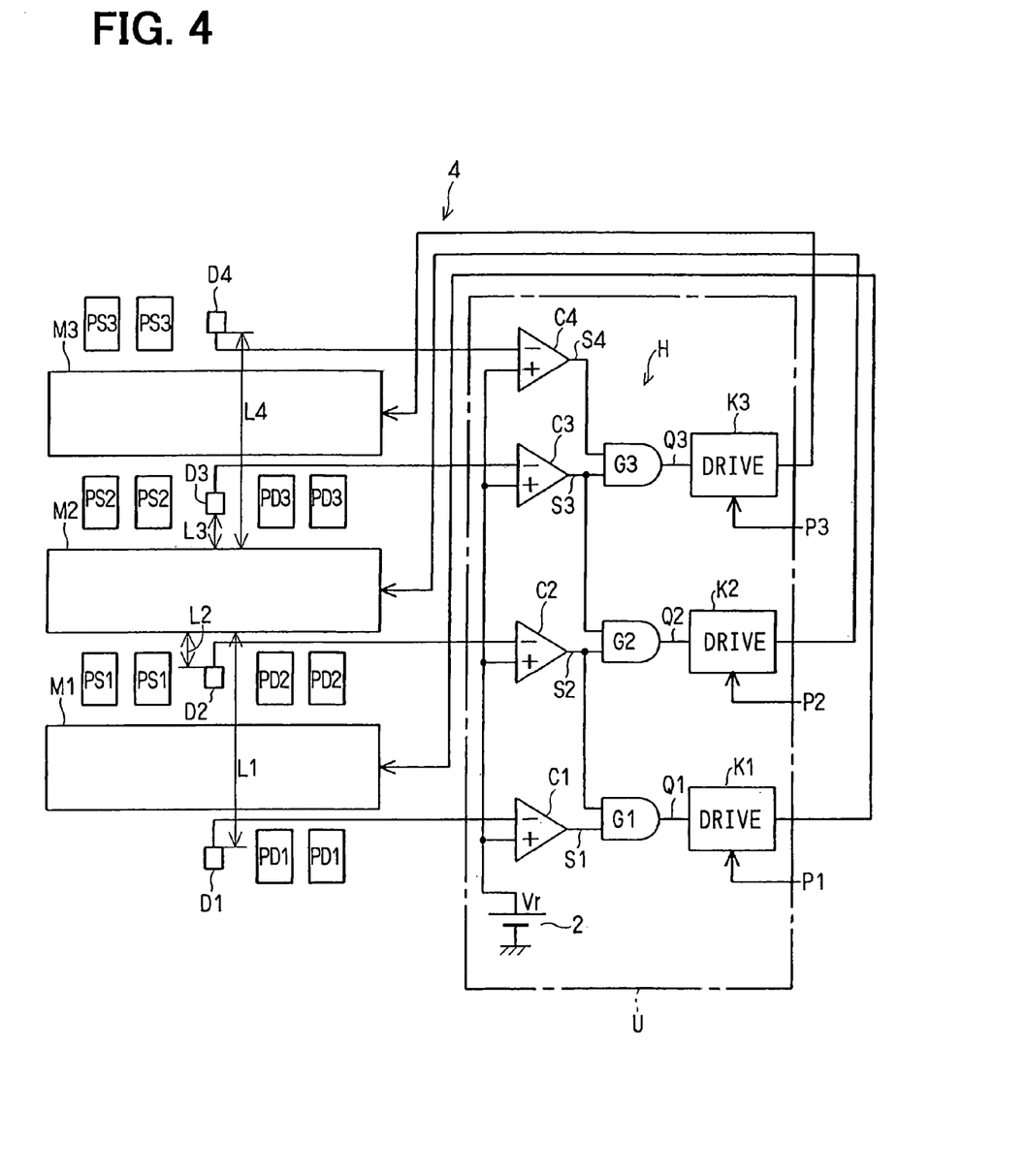
FIG. 4 is an enlarged view of the semiconductor chip with a circuit diagram of output control circuits according to the second embodiment of the present invention.

Referring to FIG. 4, a temperature detection diode Dn (n=1, 2, 3, . . . ) is provided for detecting temperatures of adjacent transistors Mn and Mn+1 (n=1, 2, 3, . . . ). For instance, diodes D2, D3, D4 are located at a midpoint between the transistors M1 and M2, between the transistors M2 and M3, and between the transistors M3 and M4 (not shown in FIG. 4), respectively. A diode D1 is provided on the opposite side of the transistor M1 from the diode D2 exclusively for the transistor M1 that is located at an end of the transistor line. Distances from the transistor M2 to diodes D1, D2, D3 and D4 are defined as L1, L2, L3 and L4, respectively, with relationships of L2=L3<L1=L4.

Output control circuits for the transistors M1, M2, M3 are combined into an output control circuit U. The output control circuit U includes an overtemperature detection circuit H and drive circuits K1, K2, K3. The overtemperature detection circuit H is constructed of comparators C1, C2, C3, C4, AND gates G1, G2, G3, and the reference voltage generation circuit 2. The comparators C1, C2, C3, C4 compare forward voltages V1, V2, V3, V4 of the diodes D1, D2, D3, D4 with the reference voltage Vr. The output control circuit U and the diodes D1, D2, D3, D4, . . . are included in an overtemperature detection device 4.

The AND gate G1 outputs an overtemperature detection signal Q1 that is an AND signal of outputs S1, S2 of the comparator C1, C2. The AND gate G2 outputs an overtemperature detection signal Q2 that is an AND signal of outputs S2, S3 of the comparator C2, C3. The AND gate G3 outputs an overtemperature detection signal Q3 that is an AND signal of outputs S3, S4 of the comparator C3, C4.

Figure 5:
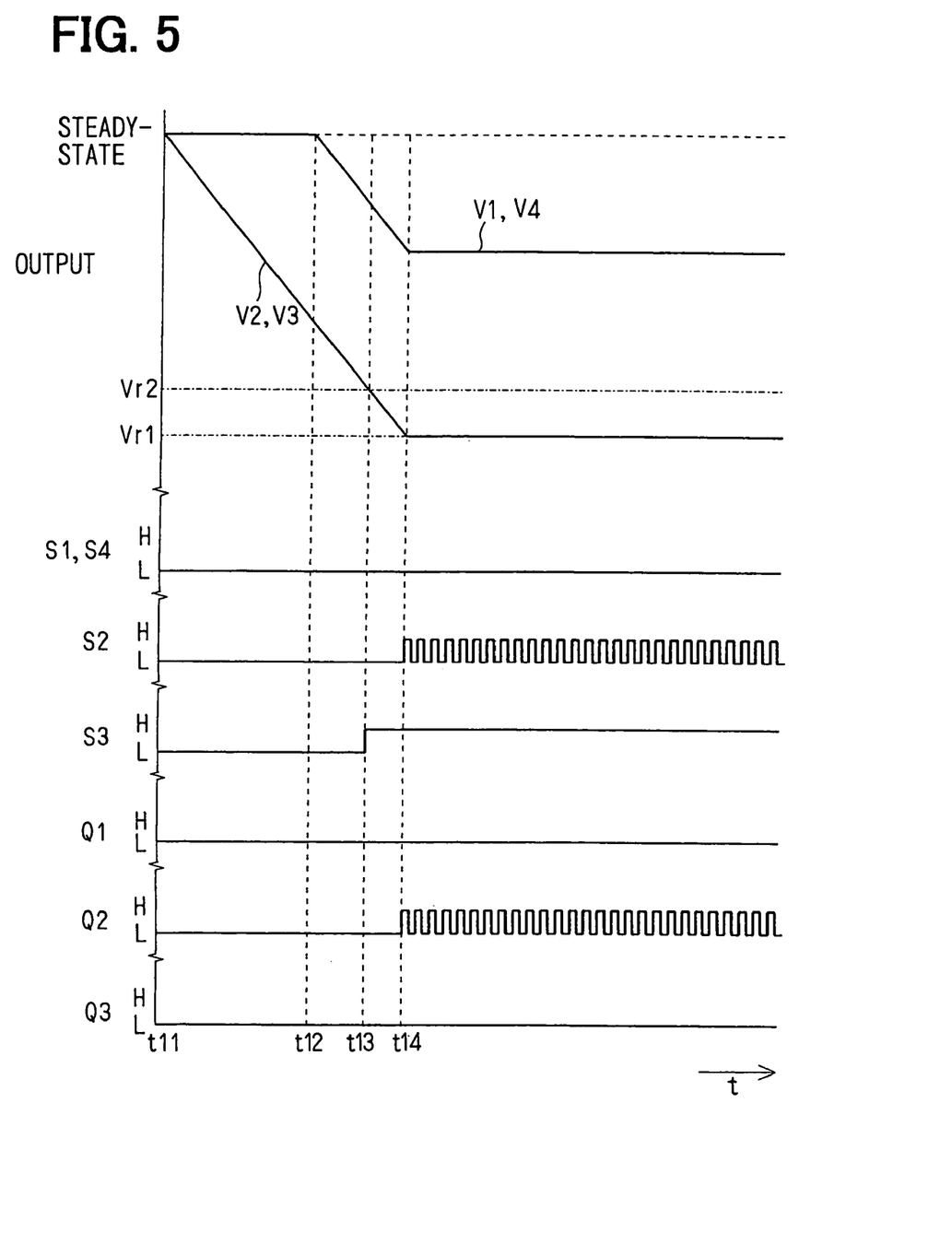
FIG. 5 is a timing chart showing waveforms of output voltages of diodes and output signals according to the second embodiment.

The voltages V1–V4 and waveforms of the signals vary under the conditions that a large amount of current flows through the transistor M2 as shown in FIG. 5. The reference voltages Vr1, Vr2 are substantial reference voltages (threshold voltages) of the comparators C1–C4. The reference voltages Vr1, Vr2 are defined with consideration of variations in offset voltages of the comparators C1–C4. The substantial reference voltage Vr1 is set for the comparator C2, input voltage of which is V2. The substantial reference voltage Vr2 is set for the comparator C1, C3, C4, input voltages of which are V1, V3 and V4, respectively.

When a large amount of current flows through the transistor M2 due to a shortage of a load, heat produced in the transistor M2 is transmitted to the diodes D2, D3 after a time lag about at time t11. The voltages V2, V3 of the diodes D2, D3 decrease at approximately the same rate. The heat transmission to the diodes D1, D4, which are located further away from the transistor M2 than the diodes D2a, D2b, delays a time of t12–t11.

When the voltage V3 of the diodes D3 decreases to the reference voltage Vr2, the signal S3 becomes the H level (t13). The signal S2 regarding the voltage V2 of the diode D2 is still the L level at this time. Thus, the overtemperature detection signal Q2 remains at the L level. When the output voltage V2 decreases to the reference voltage Vr1, the signal S2 becomes the H level (t14). As a result, the signals S2 and S3 are both the H levels, and the detection signal Q2 shifts from the L level to the H level, namely, it indicates the overtemperature condition.

When the detection signal Q2 becomes the H level, the drive circuit K2 turns off the transistor M2. In this device, the hysteresis control is not used and the detection signal Q2 frequently shifts between the H level and the L level so that the output voltage V2a does not exceeds the reference voltage Vr1 because hysteresis control is not used. The transistor M2 repeatedly turns on and off according to the detection signal Q2. As a result, the temperature of the transistor M2 is restricted within the operable temperature.

The detection signals Q1, Q3 remains at the L level because normal current flows through the transistors M1, M3. The output voltage V1 of the diode D1 located adjacent to the transistor M1 is much higher than the reference voltage Vr2 at time t14 because the diode D1 is located away from the transistor M2. Thus, the signal S1 remains at the L level. The other diode D2 for the overtemperature detection of the transistor M1 is shared by the transistor M2. Therefore, the signal S2 shifts between the H level and the L level.

However, the detection signal Q1 becomes the H level only in the condition that the signals S1 and S2 are both the H levels. Therefore, the detection signal Q1 remains at the L level even when the reference voltage Vr2 is higher than the reference voltage Vr1, namely, the overtemperature condition is detected earlier. This is the same in the case of the transistor M3.

The overtemperature detection device 4 has only one diode Dn (n=1, 2, 3, . . . ) between adjacent transistors Mn and Mn+1 disposed on an IC chip, and the diode Dn is shared by the transistors Mn and Mn+1. As a result, the total number of the diodes Dn is reduced to approximately one-half of the first embodiment. Furthermore, the number of wires for connecting the diodes Dn with the output control circuit U is reduced. Since the diode Dn is located at the midpoint between the transistors Mn and Mn+1, heat produced in either transistor can be well detected with delay times as fast as possible.

The overtemperature detection device 4 can perform accurate overtemperature detection for the transistor Mn without being affected by heat produced in the adjacent transistor Mn−1, Mn+1. Therefore, the transistor Mn is properly protected. Furthermore, the total size of the IC chip can be reduced.

The present invention should not be limited to the embodiment previously discussed and shown in the figures, but may be implemented in various ways without departing from the spirit of the invention. For example, the transistors Mn (n=1, 2, 3, . . . ) may be arranged in matrix. In this case, the diodes Dn still can be arranged in the same manner as the embodiments or one diode may by arranged in a middle among three or four transistors Mn.

Three diodes may be provided for each transistor Mn. In this case, the overtemperature detection signal Qn is produce based on an AND of three signals Sna, Snb, Snc by the overtemperature detection circuit Hn. Alternatively, the detection signal Qn can be produced when at least two signals become the H level.

In the comparators Can, Cnb and Cn, it is preferable that comparisons are performed with hysteresis characteristics. This is possible by using different reference voltages (threshold voltages) in the case that the overtemperature condition has been detected and that the overtemperature condition has not been detected. Erroneous overtemperature detection due to noise or other factors can be reduced by using the hysteresis characteristics. Moreover, frequent switching of the transistor Mn between on and off in during the overtemperature detection can be reduced.

The overtemperature detection device can be used for circuits constructed of discrete components. It can be used for a circuit board on which multiple semiconductor chips are mounted and that is included in a hybrid-IC. It also can be used for a transistor alley constructed of multiple molded transistors, and a parallel module. The power components are not limited to transistors and diodes, and passive components including relays, resistors and capacitors, motors, solenoids and actuators may be used. The temperature detection components are not limited to diodes.

What is claimed is:

1. An overtemperature detection device for detecting an overtemperature condition of each of adjacently arranged power components, each of which has a plurality of sides, comprising:

temperature detection components; and an overtemperature detection circuit, wherein at least two temperature detection components are disposed adjacent to each power component, a first temperature detection component of the two temperature detection components is placed adjacent to any one of the sides of the power component, a second temperature detection component of the two temperature detection components is placed adjacent to another side of the power component, the overtemperature detection circuit detects the overtemperature condition of the power components based on temperature detection signals outputted from at least two of the temperature detection components, the at least two temperature detection components have temperature characteristics, which correspond to the temperature detection signals, and the temperature characteristics of the at least two temperature detection components are substantially equivalent to each other.

2. The overtemperature detection device according to claim 1, wherein:

one temperature detection component is disposed between two adjacent power components; and the one temperature detection component is used for detecting the overtemperature condition of the two adjacent power components.

3. The overtemperature detection device according to claim 2, wherein the one temperature detection component is disposed at a midpoint between the two adjacent power components.

4. The overtemperature detection device according to claim 1, wherein the temperature detection components are used exclusively for the overtemperature detection of the power component, adjacent to which the temperature detection components are disposed.

5. The overtemperature detection device according to claim 1, wherein the overtemperature detection circuit determines the overtemperature condition of the power component when temperature detection signals outputted from the temperature detection components disposed adjacent to the power component exceed a threshold.

6. The overtemperature detection device according to claim 5, wherein the threshold is set at different values in a case that the overtemperature condition has been detected and in a case that the overtemperature condition has not been detected.

7. The overtemperature detection device according to claim 1, further comprising an overtemperature protection circuit for controlling power supply to the power component while the overtemperature condition continues to be detected by the overtemperature detection circuit.

8. A semiconductor integrated circuit device comprising:

a semiconductor circuit board;

a plurality of power components arranged adjacent to each other on the semiconductor circuit board;

temperature detection components; and an overtemperature detection circuit, wherein
at least two temperature detection components are disposed adjacent to each power component,
a first temperature detection component of the two temperature detection components is placed adjacent to any one of the sides of the power component,
a second temperature detection component of the two temperature detection components is placed adjacent to another side of the power component,
the overtemperature detection circuit detects the overtemperature condition of the power components based on temperature detection signals outputted from at least two of the temperature detection components,
the at least two temperature detection components have temperature characteristics, which correspond to the temperature detection signals, and
the temperature characteristics of the at least two temperature detection components are substantially equivalent to each other.

* * * * *